United States Patent
Kaneko

(10) Patent No.: US 8,478,031 B2
(45) Date of Patent: Jul. 2, 2013

(54) IMAGE PROCESSING USING COLORED COLORANT AMOUNTS AND COLORLESS COLORANT AMOUNTS

(75) Inventor: Chiaki Kaneko, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 542 days.

(21) Appl. No.: 12/783,387

(22) Filed: May 19, 2010

(65) Prior Publication Data

US 2010/0322508 A1  Dec. 23, 2010

(30) Foreign Application Priority Data

Jun. 17, 2009 (JP) .................. 2009-144642

(51) Int. Cl.
  G06K 9/00 (2006.01)
  G06F 15/00 (2006.01)

(52) U.S. Cl.
  USPC ........................................ 382/162; 358/1.9

(58) Field of Classification Search
  None
  See application file for complete search history.

(56) References Cited

U.S. PATENT DOCUMENTS

| | | | | |
|---|---|---|---|---|
| 4,846,578 A * | 7/1989 | Morita et al. | ................ | 356/446 |
| 5,162,860 A * | 11/1992 | Nami et al. | ................ | 358/501 |
| 6,863,374 B2 | 3/2005 | Yamazaki et al. | | |
| 6,939,002 B2 * | 9/2005 | Janosky et al. | ................ | 347/106 |
| 7,196,714 B2 * | 3/2007 | Someno | ................ | 347/212 |
| 7,234,793 B2 | 6/2007 | Yamazaki et al. | | |
| 7,237,866 B2 | 7/2007 | Yamazaki et al. | | |
| 7,261,405 B2 * | 8/2007 | Ohya et al. | ................ | 347/100 |
| 7,316,473 B2 * | 1/2008 | Matsuzawa et al. | ........... | 347/100 |
| 7,497,540 B2 * | 3/2009 | Mizutani et al. | ................ | 347/15 |
| 7,562,956 B2 | 7/2009 | Yamazaki et al. | | |
| 7,639,400 B2 * | 12/2009 | Hains | ............. | 358/3.06 |
| 2002/0167681 A1 * | 11/2002 | Ide et al. | ................ | 358/1.9 |
| 2003/0099007 A1 * | 5/2003 | Towner et al. | ................ | 358/520 |
| 2003/0189626 A1 * | 10/2003 | Kataoka et al. | ................ | 347/98 |
| 2003/0193553 A1 * | 10/2003 | Issler | ............. | 347/100 |
| 2004/0030001 A1 * | 2/2004 | Ma et al. | ................ | 523/160 |
| 2005/0031379 A1 * | 2/2005 | Toyohara | ................ | 399/223 |
| 2005/0062819 A1 * | 3/2005 | Ohya et al. | ................ | 347/96 |
| 2005/0156964 A1 * | 7/2005 | Hoshino | ................ | 347/9 |
| 2005/0157067 A1 * | 7/2005 | Hoshino | ................ | 347/43 |
| 2005/0169680 A1 * | 8/2005 | Ng et al. | ................ | 399/341 |
| 2005/0219569 A1 * | 10/2005 | Yamamoto et al. | ........... | 358/1.9 |
| 2006/0127151 A1 * | 6/2006 | Schulze-Hagenest et al. | ................ | 399/407 |
| 2006/0227194 A1 * | 10/2006 | Hoshino | ................ | 347/102 |

(Continued)

FOREIGN PATENT DOCUMENTS

| | | |
|---|---|---|
| JP | 3591534 | 11/2004 |
| JP | 2005074878 A * | 3/2005 |
| JP | 2005199602 A * | 7/2005 |
| JP | 2007-199291 | 8/2007 |

*Primary Examiner* — Wenpeng Chen
(74) *Attorney, Agent, or Firm* — Fitzpatrick, Cella, Harper & Scinto

(57) ABSTRACT

Image processing in which input image signals are converted into output image signals represented as a combination of colored and colorless colorant amounts. For each pixel of an input image represented by the input image signal, it is determined whether the pixel belongs to a high or low density range. For each pixel belonging to the high density range, it is specified whether the pixel belongs to a high or low frequency region of the input image. Color conversion with a 1st conversion parameter is applied to an input image signal corresponding to a pixel belonging to the high frequency region, and color conversion with a 2nd conversion parameter is applied to an input image signal corresponding to a pixel belonging to the low frequency region.

12 Claims, 9 Drawing Sheets

U.S. PATENT DOCUMENTS

| | | |
|---|---|---|
| 2007/0052785 A1* | 3/2007 | Itoh et al. ................... 347/101 |
| 2007/0115487 A1* | 5/2007 | Ide et al. ..................... 358/1.4 |
| 2007/0171444 A1 | 7/2007 | Washino |
| 2007/0201054 A1* | 8/2007 | Billow et al. ................ 358/1.8 |
| 2007/0211100 A1* | 9/2007 | Mizutani et al. ............ 347/19 |
| 2008/0013975 A1* | 1/2008 | Yasutomi et al. ........... 399/67 |
| 2008/0239349 A1 | 10/2008 | Kaneko |
| 2009/0097063 A1* | 4/2009 | Mizuno ...................... 358/1.15 |
| 2009/0169112 A1* | 7/2009 | Inoue et al. ................. 382/199 |
| 2010/0202811 A1* | 8/2010 | Hryhorenko et al. ...... 399/341 |
| 2010/0209611 A1* | 8/2010 | Ohshima et al. ............ 427/256 |
| 2011/0043840 A1* | 2/2011 | Iinuma ......................... 358/1.9 |

* cited by examiner

IMAGE PROCESSING USING COLORED COLORANT AMOUNTS AND COLORLESS COLORANT AMOUNTS

BACKGROUND OF THE INVENTION

1. Field of the Invention

The present invention relates to an image processing apparatus and control method thereof and, more particularly, to an image processing apparatus which converts input image signals into output image signals represented as a combination of the colored colorant amounts and colorless colorant amounts, and a control method thereof.

2. Description of the Related Art

With recent advances in printing techniques, attention has been paid to improving the image quality dependent on graininess and glossiness in addition to reproduction of tint. In particular, gloss nonuniformity is one factor which greatly degrades the image quality, so a technique for suppressing gloss nonuniformity is needed. As the technique of suppressing gloss nonuniformity, the gloss within an image is made uniform using both colored and colorless colorants. For example, Japanese Patent No. 3591534 proposes a method of controlling the colorless colorant amount based on the type of print medium or the colored colorant amount used. According to this method, when a glossy print medium is used, the colorless colorant amount in a region where no colored colorant is applied is set larger than that in a region where the colored colorant is applied. This suppresses gloss nonuniformity within an image.

However, the simultaneous use of colored and colorless colorants poses the following problem.

It is generally known that when colored and colorless colorants are used at the same time, the reproduced color density becomes lower than the original density of the colored colorant. Particularly when a wide area such as the background has a dark color such as black, degradation of the image quality due to a decrease in the color density stands out.

SUMMARY OF THE INVENTION

The present invention has been made to solve the above problems, and provides an image processing apparatus capable of obtaining a high-quality image by ensuring gloss uniformity while suppressing decrease of the density when forming an image using both colored and colorless colorants, and a control method thereof.

According to one aspect of the invention, an image processing apparatus which converts input image signals into output image signals represented as a combination of colored colorant amounts and colorless colorant amounts comprises:

a determination unit configured to determine for each pixel of an input image represented by the input image signal, whether the pixel is belonging to a high density range or a low density range;

a specification unit configured to specify for each pixel belonging to the high density range, whether the pixel is belonging to a high frequency range or a low frequency range; and a generation unit configured to generate the output image signal by applying color conversion with a 1st conversion parameter to an input image signal corresponding to a pixel belonging to the high frequency range, and applying color conversion with a 2nd conversion parameter to an input image signal corresponding to a pixel belonging to the low frequency range, wherein a colorless colorant amount for an output image signal generated by the color conversion with the 1st conversion parameter is larger than a colorless colorant amount for an output image signal generated by the color conversion with the 2nd conversion parameter.

According to the present invention with this arrangement, a high-quality image can be obtained by ensuring gloss uniformity while suppressing decrease of the density when forming an image using both colored and colorless colorants.

Further features of the present invention will become apparent from the following description of exemplary embodiments (with reference to the attached drawings).

DESCRIPTION OF THE EMBODIMENTS

Preferred embodiments of the present invention will now be described in detail with reference to the accompanying drawings. Components described in the following embodiments are merely illustrative, and the invention is not limited to them.

First Embodiment

System Configuration

Figure 1:
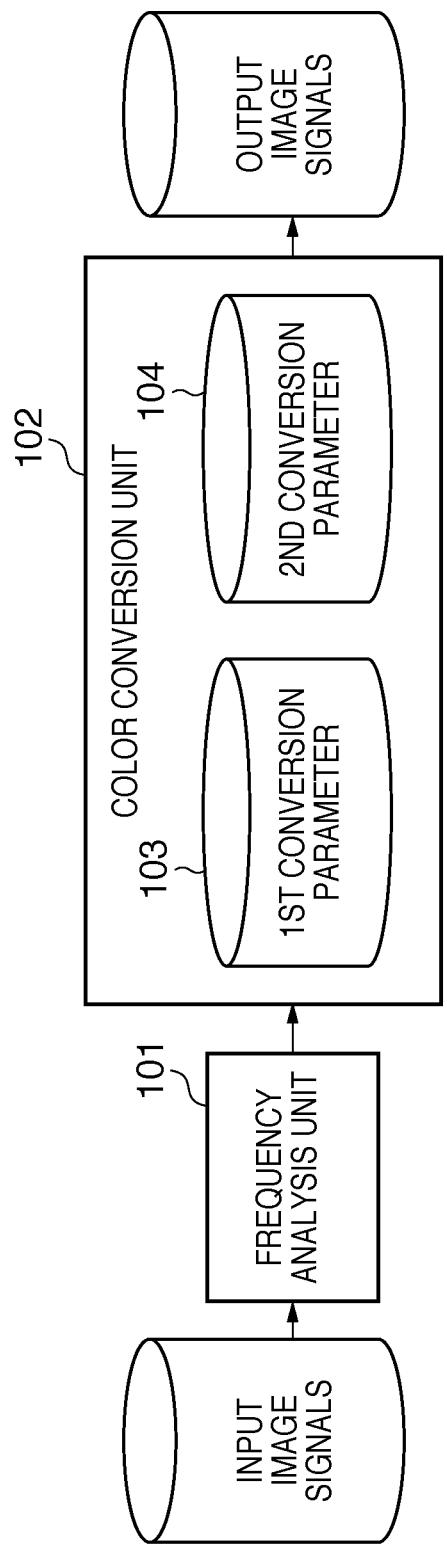
FIG. 1 is a block diagram showing the schematic functional arrangement of an image processing apparatus in the first embodiment.

An image processing apparatus in the first embodiment forms an image using both colored and colorless colorants. FIG. 1 shows a schematic functional arrangement when performing color conversion processing in the image processing apparatus according to the first embodiment. As shown in FIG. 1, in color conversion processing according to the embodiment, input image signals such as RGB values, CMYK values, or L*a*b* values are converted into output image signals represented as a combination of colorant amounts. The input image signals may be device-dependent values such as RGB values or CMYK values, or device-independent values such as L*a*b* values or XYZ values. The output image signals can be expressed as a combination of the colored colorant amounts and colorless colorant amounts used in a printer. The colored colorants are, for example, C, M, Y, and K color inks. The colorless colorant can be a clear ink.

In FIG. 1, a frequency analysis unit 101 analyzes the frequency characteristics of an input image. A color conversion unit 102 performs color conversion using a 1st conversion parameter 103 and 2nd conversion parameter 104 based on the result of analysis by the frequency analysis unit 101. The 1st conversion parameter 103 is a parameter suitable for gloss uniformity. It is designed to make the gloss reproduced by output image signals after color conversion by using the 1st conversion parameter 103 uniform. The 2nd conversion parameter 104 is a parameter suitable for density reproduction. It is designed not to decrease the maximum perceptual density which can be reproduced when only colored colorants are used. The color conversion unit 102 can be implemented using a lookup table (LUT) method, matrix method, or the like. In the following description, the embodiment is premised on the assumption that the color conversion unit 102 runs based on the LUT method. More specifically, in the color conversion unit 102, the 1st and 2nd conversion parameters 103 and 104 are the 1st and 2nd LUTs designed in the lookup table format.

Figure 2:
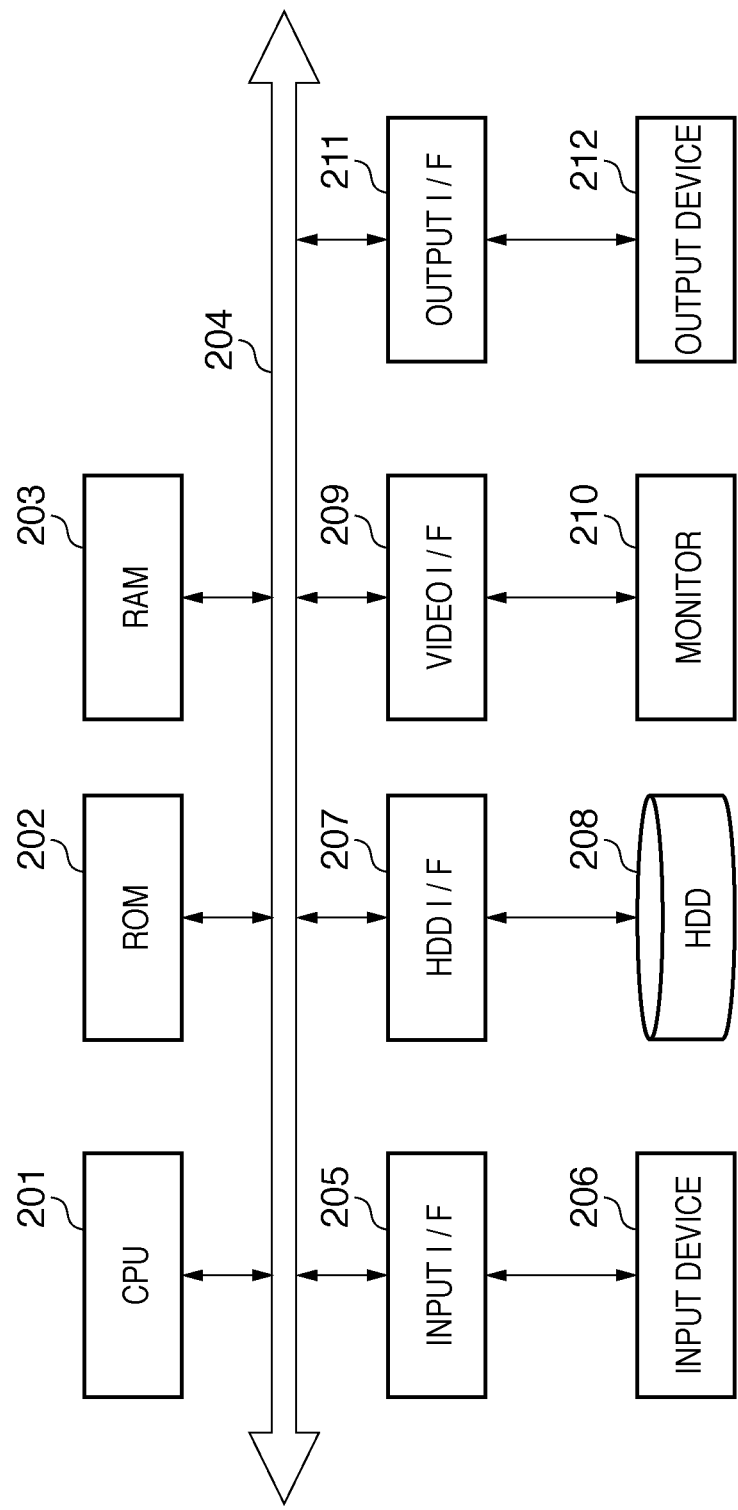
FIG. 2 is a block diagram showing the system configuration of the image processing apparatus in the first embodiment.

FIG. 2 is a block diagram exemplifying the system configuration of the image processing apparatus in the embodiment. In FIG. 2, a CPU 201 executes programs stored in a ROM 202 and hard disk drive (HDD) 208 while using a RAM 203 as a work memory. The CPU 201 controls respective components (to be described later) via a system bus 204, thereby executing various processes including color adjustment processing (to be described later).

An input interface (I/F) 205 is a serial bus interface such as a USB or IEEE1394 interface for connecting an input device 206 including a keyboard, mouse, digital camera, scanner, and colorimeter. The CPU 201 can read data from the input device 206 via the input I/F 205.

An HDD interface (I/F) 207 is an interface such as a serial ATA (SATA) interface for connecting a secondary storage device such as the HDD 208 or an optical disk drive.

The CPU 201 can read data out from the HDD 208 via the HDD I/F 207 and write data in to the HDD 208. Further, the CPU 201 can load, in the RAM 203, data stored in the HDD 208, and save, in the HDD 208, the data loaded in the RAM 203. The CPU 201 can execute the data loaded in the RAM 203 as a program.

A video interface (I/F) 209 is an interface for connecting a monitor 210. The CPU 201 can display arbitrary text and images on the monitor 210 by controlling the video I/F 209.

An output interface (I/F) 211 is a serial bus interface such as a USB or IEEE1394 interface for connecting an output device 212 such as a printer, plotter, or film recorder. The CPU 201 can execute printing and recording by sending data to the output device 212 via the output I/F 211. Note that the input I/F 205 and output I/F 211 can be combined into one using a two-way communication interface such as a USB or IEEE1394 interface.

Color Conversion Processing

Figure 3:
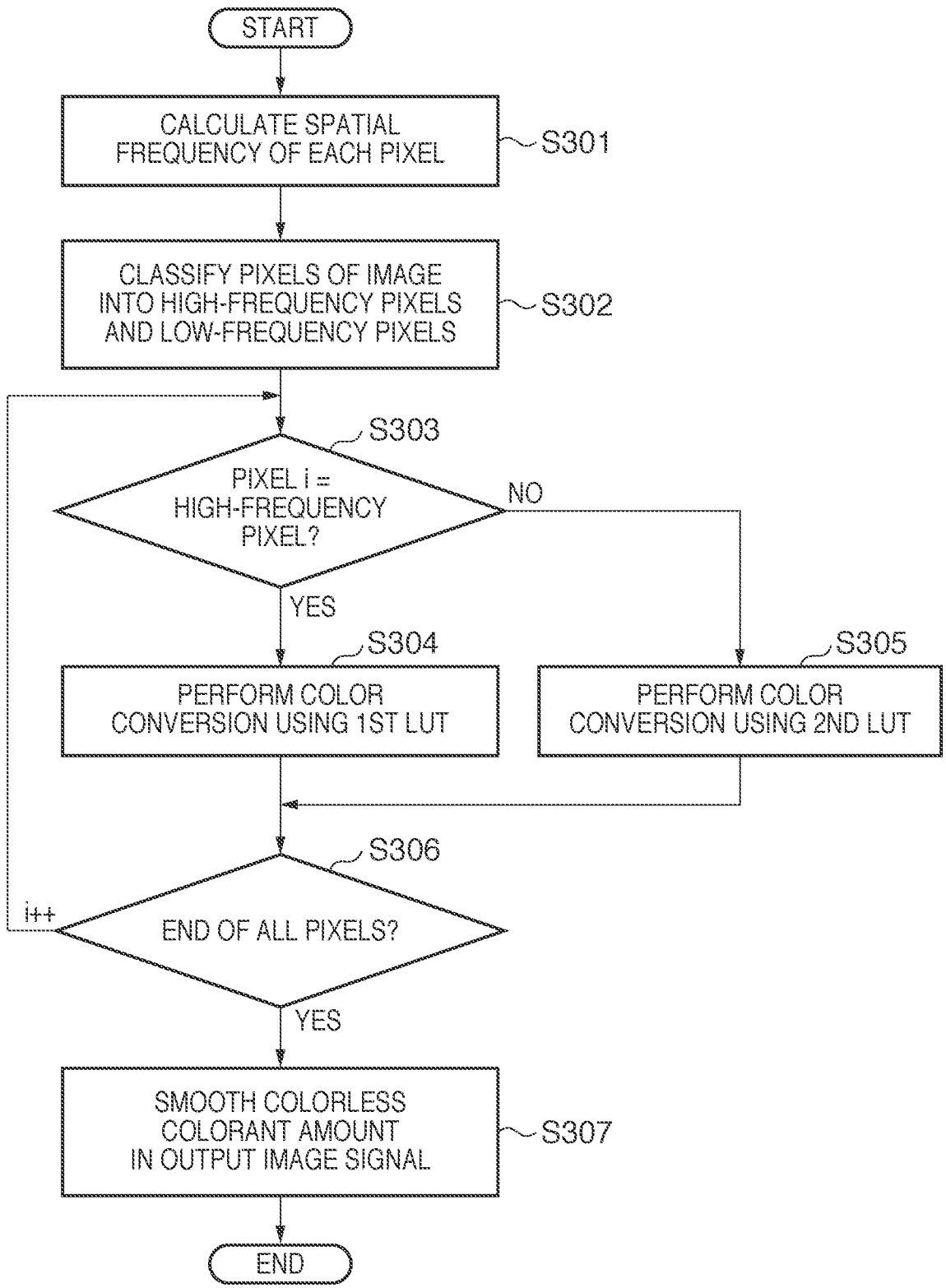
FIG. 3 is a flowchart showing color conversion processing according to the first embodiment.

FIG. 3 is a flowchart showing the operation sequence of color conversion processing in the image processing apparatus shown in FIG. 2 according to the embodiment. More specifically, a computer-executable program which describes the sequence shown in the flowchart of FIG. 3 is loaded from the ROM 202 or HDD 208 into the RAM 203. The CPU 201 can perform the processing by executing the program.

The color conversion processing shown in FIG. 3 will now be explained. In step S301, the spatial frequency is calculated for each pixel of an input image. The spatial frequency calculation method can be a general frequency analysis method such as discrete cosine transform, discrete Fourier transform, or discrete wavelet transform. The RAM 203 stores the calculated spatial frequency in association with each pixel. When the data amount is large, the HDD 208 or the like is also available.

In step S302, the pixels of the input image are classified into a plurality of frequency regions based on the spatial frequency calculated in step S301. More specifically, a pixel having a spatial frequency higher than a predetermined threshold is classified as a pixel belonging to the high frequency region (high-frequency pixel). A pixel having a spatial frequency lower than the threshold is classified as a pixel belonging to the low frequency region (low-frequency pixel). The RAM 203 or HDD 208 stores the classification result of each pixel.

In the embodiment, the conversion parameter is switched in accordance with the frequency region to which each pixel has been classified in step S302. By using the conversion parameters, an output image signal corresponding to an input image signal is calculated. More specifically, it is determined in step S303 whether the pixel is a high-frequency pixel. If the pixel is a high-frequency pixel, the process advances to step S304. In step S304, color conversion is done using the 1st LUT designed to be suitable for gloss uniformity, thereby acquiring an output image signal. If the pixel is not a high-frequency pixel but a low-frequency pixel, the process advances to step S305. In step S305, color conversion is performed using the 2nd LUT designed to be suitable for density reproduction, thereby acquiring an output image signal. The RAM 203 or HDD 208 stores the output image signal acquired in step S304 or S305. Details of the 1st and 2nd LUTs will be described later.

In step S306, it is determined whether all the pixels of the input image signal have undergone the processes in steps S303 to S305. If NO in step S306, the next pixel is processed; if YES, the process advances to step S307.

In step S307, smoothing processing for the colorless colorant amount is executed regarding the output image signal acquired in step S304 or S305. As the smoothing method, for example, a mean filter or median filter can be applied to the colorless colorant amount for each pixel of the output image. The smoothing processing reduces the differences in gloss and density between the high and low frequency regions in the image. After the end of step S307, the series of processes ends.

Conversion Parameter Creation Processing

A method of creating the 1st and 2nd conversion parameters used in the embodiment will be described with reference to the flowcharts of FIGS. 4 to 6.

Figure 4:
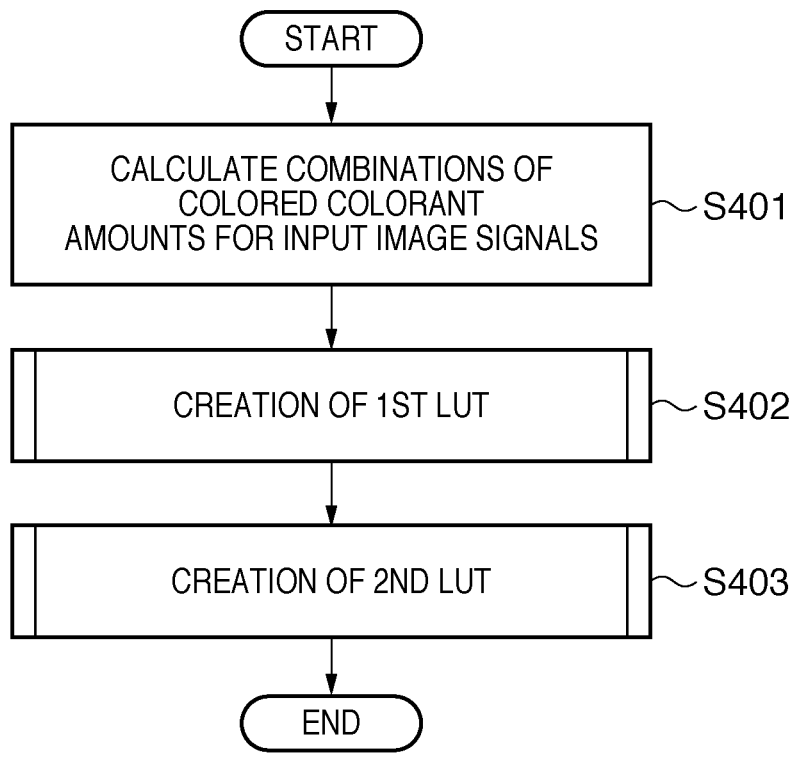
FIG. 4 is a flowchart showing an outline of processing of creating the 1st and 2nd conversion parameters in the first embodiment.

FIG. 4 is a flowchart showing an outline of processing of creating the 1st and 2nd conversion parameters, that is, the 1st and 2nd LUTs.

In step S401, color separation is executed for input image signals to calculate combinations of colored colorant amounts corresponding to the input image signals. The calculation method can be an existing color separation method. More specifically, total colorant amounts are calculated for each combination of colored colorant amounts corresponding to the input image signals. For a predetermined target color, a total colorant amounts which changes smoothly along a change of the target color (e.g., gray line) are set in advance. A combination with the same total colorant amount, as the set amount corresponding to the input image signals, is selected from all combinations of the colored colorant amounts. The selected combination is defined as an optimum combination of colored colorant amounts corresponding to the input image signals.

The RAM 203 or HDD 208 stores the obtained combinations of colored colorant amounts in association with the input image signals.

In step S402, the 1st LUT suitable for gloss uniformity within the image is created. Details of the 1st LUT creation processing will be described later.

In step S403, the 2nd LUT suitable for density reproduction is created. The 2nd LUT is created so as not to decrease the maximum perceptual density which can be reproduced using only colored colorants. Details of the 2nd LUT creation processing will be described later.

Figure 5:
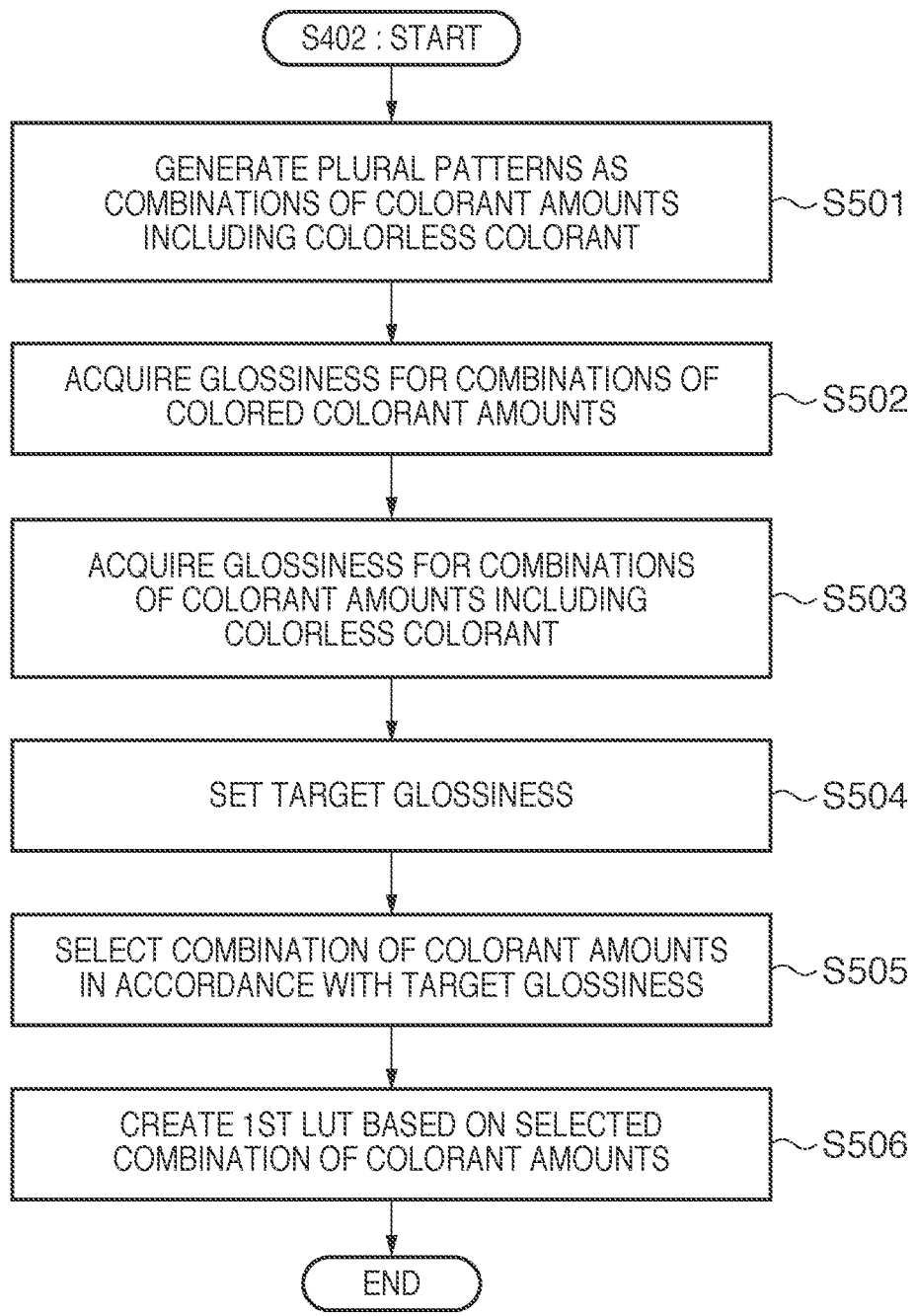
FIG. 5 is a flowchart showing the 1st LUT creation processing in the first embodiment.

FIG. 5 is a flowchart showing the 1st LUT creation processing in step S402. In step S501, a plurality of combinations of colorant amounts including colorless colorants, which correspond to input image signals, are created. More specifically, a plurality of colorless colorant amounts are further combined with each combination of colored colorant amounts calculated in step S401, to generate combinations of colorant amounts including colorless colorants, for each combination of colored colorant amounts.

In step S502, patches are output using the combinations of colored colorant amounts calculated in step S401 in correspondence with the input image signals. The patches are measured using a glossmeter to give their glosses.

In step S503, patches are output using the combinations of colorant amounts including the colorless colorants that have been generated in step S501, and the glosses of the patches are acquired. Note that the glosses acquired in steps S502 and S503 are not limited to values measured by the glossmeter. The gloss may be calculated by a simulation based on combinations of colorant amounts.

In step S504, a gloss to be reproduced (to be referred to as a target glossiness) is set. The target glossiness is set to a maximum gloss which can be reproduced using only colorless colorants for medium white, as an example. The target glossiness may be set to an arbitrary reproducible glossiness. For example, when the user wants a matte finish, the target glossiness may be set low.

In step S505, a combination of colorant amounts which exhibit the same gloss as the target glossiness is selected for the input image signals, based on the glosses acquired in steps S502 and S503. More specifically, a combination of colorant amounts is selected from the combinations of colored colorant amounts calculated in step S401, and the combinations of colorant amounts including colorless colorants that have been generated in step S501. When there is no combination of colorant amounts having the same gloss as the target glossiness, a combination of colorant amounts may be calculated by executing interpolation using two close combinations. The RAM 203 or HDD 208 stores the obtained combinations of colored colorant amounts in association with the input image signals.

In step S506, the 1st LUT suitable for gloss uniformity is created based on the correspondence between the combination of colorant amounts including colorless colorants that has been obtained in step S505, and the input image signals.

The 2nd LUT creation processing in step S403 will now be explained in detail with reference to the flowchart of FIG. 6. In step S601, a threshold D is set for the density of the input image signal. An arbitrary value can be set as the threshold D. As the threshold D, a maximum density which can be reproduced when the 1st LUT suitable for gloss uniformity that has been generated in step S402 can be used for example. The RAM 203 stores the set threshold D.

In step S602, the 2nd LUT is created for a high density range where the density of a color reproduced using the combination of colored colorant amounts calculated in step S401 is greater than or equal to the threshold D set in step S601. For the high density range, the 2nd LUT is created by associating the combination of colored colorant amounts calculated in step S401 with the input image signals. Thus, no colorless colorant is assigned for the high density range in the 2nd LUT. The colored colorant amounts in the 2nd LUT is equal to those in the 1st LUT for the high density range.

In step S603, the 2nd LUT is created for a low density range where the density of a color reproduced using the combination of colored colorant amounts calculated in step S401 is lower than the threshold D set in step S601. For the low density range, the 2nd LUT can be created by associating the input image signals with the combination of colorant amounts including colorless colorants that has been used to create the 1st LUT in step S402. Therefore, the 2nd LUT can be equal to the 1st LUT for the low density range.

Figure 7:
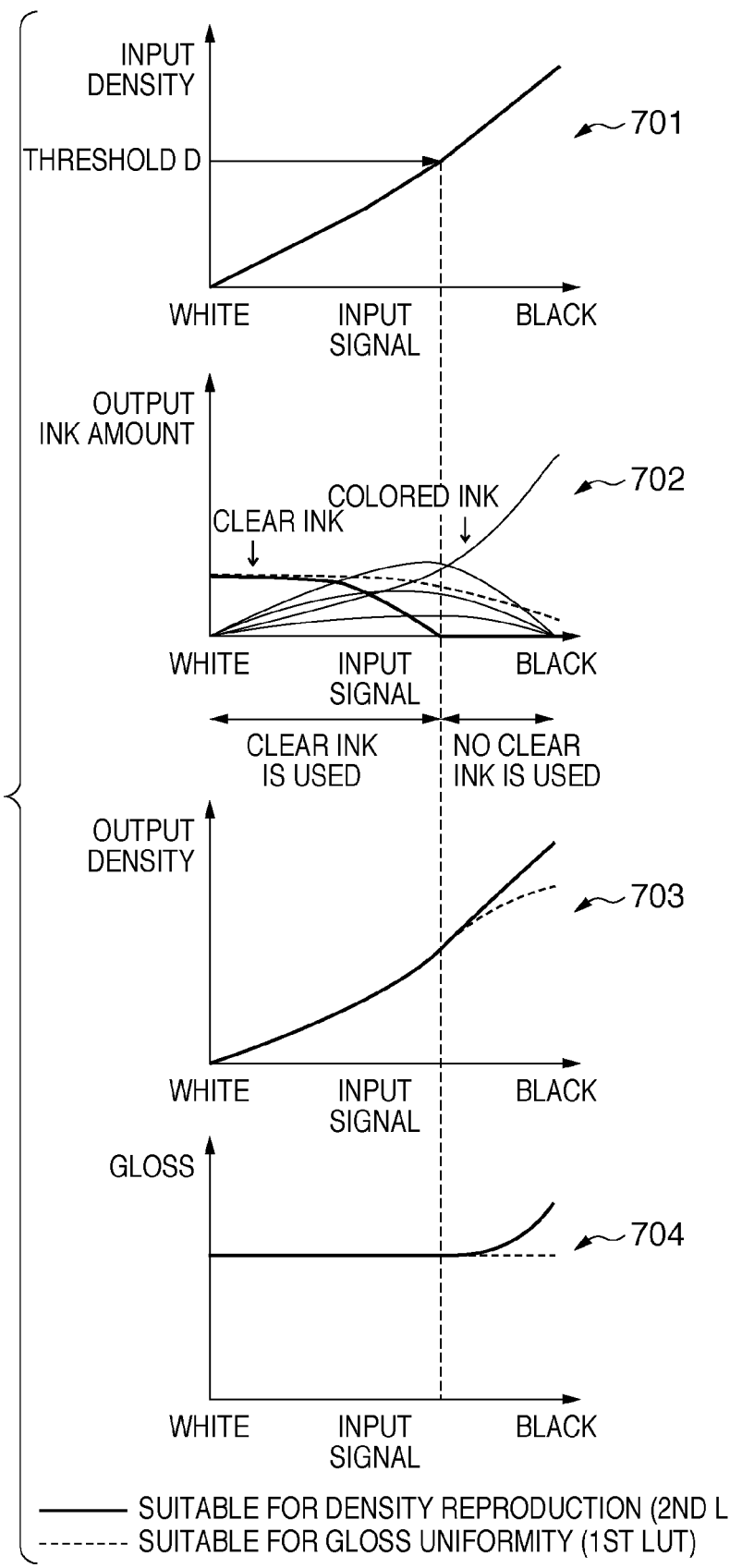
FIG. 7 shows graphs of concrete examples of the 1st and 2nd LUTs created in the first embodiment.

FIG. 7 shows an example of the 1st and 2nd LUTs created in the embodiment. In the example of FIG. 7, the gray line shown in a graph 701 is separated into colors in order to create the 1st and 2nd LUTs as shown in a graph 702.

In the graph 702, the colored colorant amount (output ink amount) is common to the 1st and 2nd LUTs. However, the colorless colorant amount differs between the 1st and 2nd LUTs. In the graph 702, the dashed line indicates the colorless colorant amount in the 1st LUT suitable for gloss uniformity, and the solid line indicates the colorless colorant amount the 2nd LUT suitable for density reproduction. The graph 702 shows that the colorless colorant is used in the entire region of the input signal in the 1st LUT. In the 2nd LUT, the colorless colorant is used in the low density range where the input density is lower than the threshold D, but is not used in the high density range where it is greater than or equal to the threshold D.

Due to this difference, the output density with respect to the input signal becomes higher in the 2nd LUT in the high density range greater than or equal to the threshold D, as represented by a graph 703. That is, decrease of the density is suppressed and the input density shown in the graph 701 is maintained, compared to the 1st LUT. In other words, decrease of the maximum perceptual density can be suppressed by performing color conversion using the 2nd LUT.

As shown in a graph 704, the gloss with respect to the input signal is kept uniform according to the 1st LUT. In the 2nd LUT, the gloss gradually changes in the high density range greater than or equal to the threshold D. In other words, gloss uniformity can be realized by performing color conversion using the 1st LUT.

Figure 6:
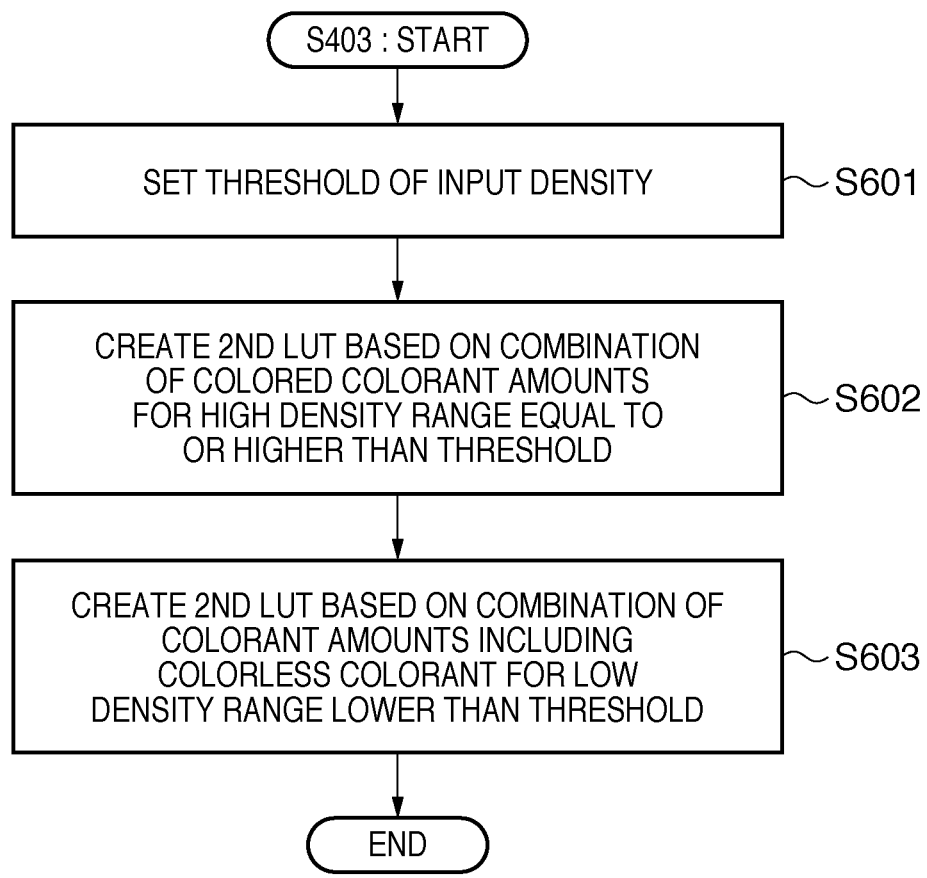
FIG. 6 is a flowchart showing the 2nd LUT creation processing in the first embodiment.

The threshold setting method in step S601 of FIG. 6 is not limited to the above example. For example, when input image signals are standardized RGB values such as sRGB values, the threshold may be set for a density obtained using a known conversion equation. Regarding input image signals, the threshold value may be set for a color density reproduced using the combination of colored colorant amounts calculated in step S401. The density at this time may be a measured density attained by outputting a patch and measuring its color, or a perceived density calculated by a simulation.

The threshold can also be set for a value which reflects density variations. For example, when input image signals are $L^*a^*b^*$ values, the threshold may be set for the $L^*$ value. Alternatively, the threshold may be set for the amount of gloss difference between a color reproduced for input image signals using the combination of colored colorant amounts calculated in step S401, and a color reproduced using the LUT suitable for gloss uniformity that is created in the above-described manner.

When the threshold is set for the L* value or amount of gloss difference, it is associated with input image signals in steps S602 and S603 as follows. More specifically, if the L* value of input image signals is lower than the threshold or if the amount of gloss difference between the two LUTs is greater than or equal to the threshold, the combination of colored colorant amounts calculated in step S401 is associated with the input image signals. If the L* value of input image signals is greater than or equal to the threshold or if the amount of gloss difference between the two LUTs is lower than the threshold, the combination of colorant amounts including colorless colorants that has been calculated in step S505 is associated with the input image signals.

In the first embodiment, the 1st and 2nd LUTs are created simultaneously. However, it suffices to design the 2nd LUT suitable for density reproduction so that the colorless colorant amount becomes 0 in the high density range. Hence, the 2nd LUT may be created independently of the 1st LUT suitable for gloss uniformity.

When color conversion is implemented by the matrix method, a matrix may be created using an approximation method typified by the least squares method, based on the correspondence between input image signals and a combination of colorant amounts that is represented by the 1st or 2nd LUT.

By creating the 1st and 2nd conversion parameters in the foregoing way, gloss uniformity can be maintained in the low density range where degradation of the image quality by decrease of the density is less conspicuous. The density can be maintained in the high density range where degradation of the image quality by decrease of the density stands out.

As described above, according to the first embodiment, the gloss characteristic is controlled by selecting a conversion parameter (LUT) based on the spatial frequency characteristics of input image signals when converting input image signals into output image signals represented as a combination of colored and colorless colorant amounts. More specifically, color conversion suitable for gloss uniformity is applied to the high frequency region where gloss nonuniformity is readily detected, thereby suppressing gloss nonuniformity. Color conversion suitable for density reproduction of colored colorants is applied to the low frequency region where decrease of the density is readily detected, thereby maintaining the density. The image processing apparatus which forms an image using both colored and colorless colorants can output a high-quality image by ensuring gloss uniformity while suppressing decrease of the density.

Second Embodiment

The second embodiment according to the present invention will now be described. In the above-described first embodiment, the frequency characteristics of all input image signals are analyzed and color conversion is done based on the results. However, the present invention is not limited to this. In the second embodiment, color conversion based on the frequency characteristics is executed in only the high density range of input image signals. In a relatively low-density image region, color conversion is performed using the 1st conversion parameter. Accordingly, gloss uniformity can be ensured while suppressing decrease of the density. No frequency characteristic is analyzed in the relatively low-density image region. In the first embodiment, output image signals are calculated while switching the color conversion parameter in accordance with the frequency characteristics. In the second embodiment, output image signals are calculated by means of weighted addition of color conversion results depending on the frequency characteristics, where each of the color conversion results is obtained by using one of a plurality of conversion parameters.

In the first embodiment, the spatial frequency is calculated for each pixel of an input image. However, it is sufficient for the spatial frequency characteristics to reflect the degree of signal value variations between neighboring pixels. Thus, the second embodiment adopts the edge intensity of an image in each pixel as the spatial frequency characteristic.

In the second embodiment, as well as the first embodiment, color conversion is executed using the 1st LUT suitable for gloss uniformity or the 2nd LUT suitable for density reproduction.

Figure 8:
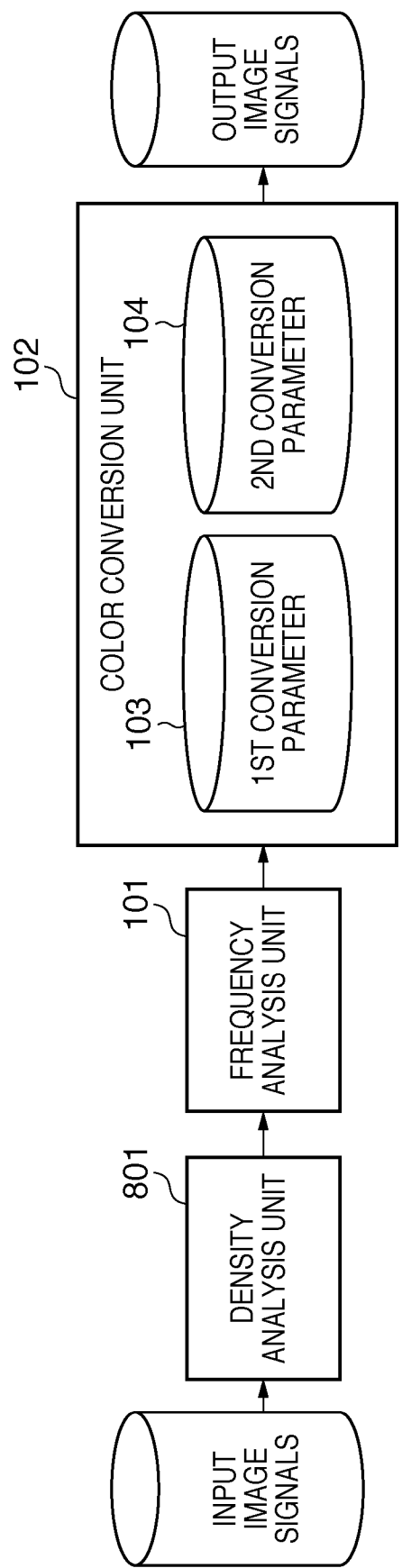
FIG. 8 is a block diagram showing the schematic functional arrangement of an image processing system in the second embodiment.

FIG. 8 shows a schematic functional arrangement in an image processing apparatus according to the second embodiment. As shown in FIG. 8, the image processing apparatus according to the second embodiment includes a density analysis unit 801 which analyzes the density characteristic of an input image. The same reference numerals as those in the first embodiment denote the same components as those in FIG. 1, and a description thereof will not be repeated.

Figure 9:
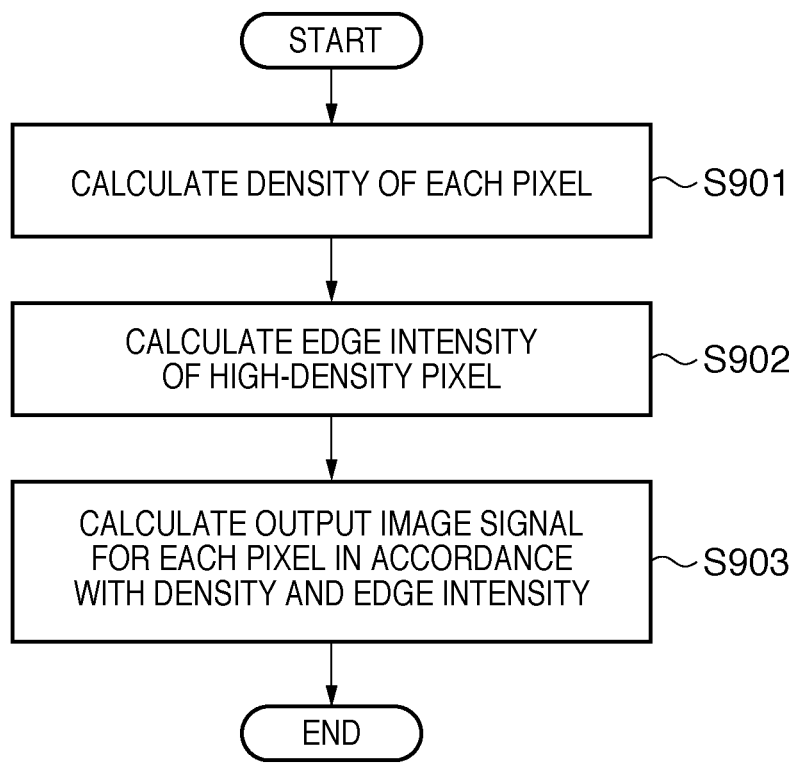
FIG. 9 is a flowchart showing color conversion processing according to the second embodiment.

The color conversion processing according to the second embodiment will now be explained with reference to the flowchart of FIG. 9.

In step S901, the density is calculated for each pixel of an input image. More specifically, a density LUT is created in advance by obtaining density values for a plurality of input image signals. With the density LUT, a density value can be obtained for each pixel of the input image signal. It suffices to create the density LUT as follows. First, a parameter for converting an input image signal into an output image signal is created by a known color separation method. Then, the density of a color to be reproduced is associated with an input image signal using the conversion parameter. Note that the density calculation method is not limited to this. For example, when input image signals are standardized RGB values such as sRGB values, the density may be calculated using a known conversion equation. A RAM 203 stores the calculated density in association with each pixel. When the data amount is large, an HDD 208 or the like is also available.

In step S902, the edge intensity is calculated for each high-density pixel. More specifically, the edge intensity is calculated by applying edge detection processing typified by a Laplacian filter to a high-density pixel whose density obtained in step S901 is higher than a predetermined threshold. As the threshold, an arbitrary value can be used. In this case, the threshold is set as follows. More specifically, a minimum density is used as the threshold at which the gloss of a color obtained by applying color conversion with the 1st LUT suitable for gloss uniformity to an input image signal having a given density has difference from that of a color obtained by applying color conversion with the 2nd LUT suitable for density reproduction. In other words, gloss to be reproduced becomes different between a result of the color conversion with the 1st conversion parameter and a result of the color conversion with the 2nd conversion parameter, for the pixels belonging to the high density range. The RAM 203 or HDD 208 stores the calculated edge intensity in association with each pixel.

In step S903, an output image signal corresponding to an input image signal is calculated in accordance with the density calculated in step S901 and the edge intensity calculated in step S902. An example of the calculation method will be described below.

For a low-density pixel whose density obtained in step S901 is lower than a predetermined threshold, that is, a pixel whose edge intensity has not been calculated in step S902, an input image signal is converted into an output image signal using a common LUT regardless of the frequency characteristics. The LUT used at this time may be the 1st LUT which gives gloss uniformity within the image.

For a high-density pixel obtained in step S901, that is, a pixel whose edge intensity has been calculated in step S902, an output image signal is calculated in accordance with the following equation:

$$\text{output image signal} = \alpha S1 + (1-\alpha)S2$$

where S1 is a signal value obtained by converting an input image signal based on the 1st LUT suitable for gloss uniformity, S2 is a signal value obtained by converting an input image signal based on the 2nd LUT suitable for density reproduction, and $\alpha$ is an edge intensity normalized between 0 and 1.

In this fashion, according to the second embodiment, color conversion is executed using a common conversion parameter in the low density range. Gloss uniformity can be ensured while suppressing decrease of the density. In the high density range, a conversion result based on the 1st LUT suitable for gloss uniformity and a conversion result based on the 2nd LUT suitable for density reproduction are combined in consideration of the edge intensity. As a result, conversion processing can be smoothly switched in accordance with the frequency characteristics.

In the second embodiment, the density of each pixel is calculated in step S901. However, the lightness may be calculated instead of the density. The lightness is highly correlated to the density. In this case, a low-lightness pixel can be regarded as a high-density pixel in the second embodiment, and the processes in steps S902 and S903 can be directly applied.

As described above, according to the second embodiment, frequency analysis, that is, edge detection is executed in only the high density range of input image signals. Color conversion with the 2nd LUT can be applied to pixels belonging to both the high density range and the low frequency region. Color conversion with the 1st LUT can be applied to the remaining pixels. In general, frequency analysis takes a long processing time. Thus, color conversion processing can be achieved more quickly by analyzing frequency of the pixels belonging to the high density range.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-144642, filed Jun. 17, 2009, which is hereby incorporated by reference herein in its entirety.

What is claimed is:

1. An image processing apparatus which converts input image signals into output image signals represented as a combination of colored colorant amounts and colorless colorant amounts, the apparatus comprising:
   a determination unit configured to determine for each pixel of an input image represented by an input image signal, whether the pixel is belonging to a high density range or a low density range;
   a specification unit configured to specify for each pixel belonging to the high density range, whether the pixel is belonging to a high frequency region of the input image or a low frequency region of the input image; and
   a generation unit configured to generate an output image signal by applying color conversion with a 1st conversion parameter to an input image signal corresponding to a pixel belonging to the high frequency region, and applying color conversion with a 2nd conversion parameter to an input image signal corresponding to a pixel belonging to the low frequency region,
   wherein a colorless colorant amount for an output image signal generated by the color conversion with the 1st conversion parameter is larger than a colorless colorant amount for an output image signal generated by the color conversion with the 2nd conversion parameter.

2. The apparatus according to claim 1, wherein
   the 1st conversion parameter is created to make gloss of the image represented by the output image signal uniform, and
   the 2nd conversion parameter is created to suppress decrease of a density of the image represented by the output image signal.

3. The apparatus according to claim 1, wherein the 2nd conversion parameter is created so as to prevent decrease of a maximum perceptual density which can be reproduced after the color conversion.

4. The apparatus according to claim 1, wherein
   the 2nd conversion parameter is created such that the colorless colorant amount is made zero for pixels belonging to the high density range in output image signal, and
   a density of the pixel belonging to the high density range is higher than a determined threshold.

5. The apparatus according to claim 4, wherein the 2nd conversion parameter is created such that a colored colorant amount generated by the color conversion using the 2nd conversion parameter becomes equal to the colored colorant amount generated using the 1st conversion parameter.

6. The apparatus according to claim 4, wherein the threshold is determined to be a maximum density which can be reproduced by the color conversion with the 1st conversion parameter.

7. The apparatus according to claim 1, wherein gloss to be reproduced becomes different between a result of the color conversion with the 1st conversion parameter and a result of the color conversion with the 2nd conversion parameter, for the pixels belonging to the high density range.

8. The apparatus according to claim 1, further comprising a smoothing unit configured to apply smoothing to the colorless colorant amount within the output image.

9. The apparatus according to claim 1, wherein the 1st conversion parameter and the 2nd conversion parameter take the form of lookup table.

10. An image processing apparatus which converts input image signals into output image signals represented as a combination of colored colorant amounts and colorless colorant amounts, the apparatus comprising:

a determination unit configured to determine for each pixel of an input image represented by an input image signal, whether the pixel is belonging to a high density range or a low density range;

a specification unit configured to specify for each pixel belonging to the high density range, whether the pixel is belonging to a high frequency region of the input image or a low frequency region of the input image; and a generation unit configured to apply color conversion with a 1st conversion parameter to an input image signal corresponding to a pixel belonging to the high frequency region, to apply color conversion with a 2nd conversion parameter to an input image signal corresponding to a pixel belonging to the low frequency region, and to generate an output image signal by means of weighted addition of results of the color conversion with the 1st conversion parameter and that with the 2nd conversion parameter, wherein said generation unit weights the result of the color conversion with the 1st conversion parameter for pixels belonging to the high frequency range, and weights the result of the color conversion with the 2nd conversion parameter for pixels belonging to the low frequency range, and wherein a colorless colorant amount for an output image signal generated by the color conversion with the 1st conversion parameter is larger than a colorless colorant amount for an output image signal generated by the color conversion with the 2nd conversion parameter.

11. A method of controlling an image processing apparatus which converts input image signals into output image signals represented as a combination of colored colorant amounts and colorless colorant amounts, the method comprising:

determining for each pixel of an input image represented by an input image signal, whether the pixel is belonging to a high density range or a low density range;

specifying for each pixel belonging to the high density range, whether the pixel is belonging to a high frequency region of the input image or a low frequency region of the input image; and generating an output image signal by applying color conversion with a 1st conversion parameter to an input image signal corresponding to a pixel belonging to the high frequency region, and applying color conversion with a 2nd conversion parameter to an input image signal corresponding to a pixel belonging to the low frequency region, wherein a colorless colorant amount for an output image signal generated by the color conversion with the 1st conversion parameter is larger than a colorless colorant amount for an output image signal generated by the color conversion with the 2nd conversion parameter.

12. A non-transitory computer-readable storage medium storing a program for controlling a computer to execute the method according to claim 11.

* * * * *